Figure 1:
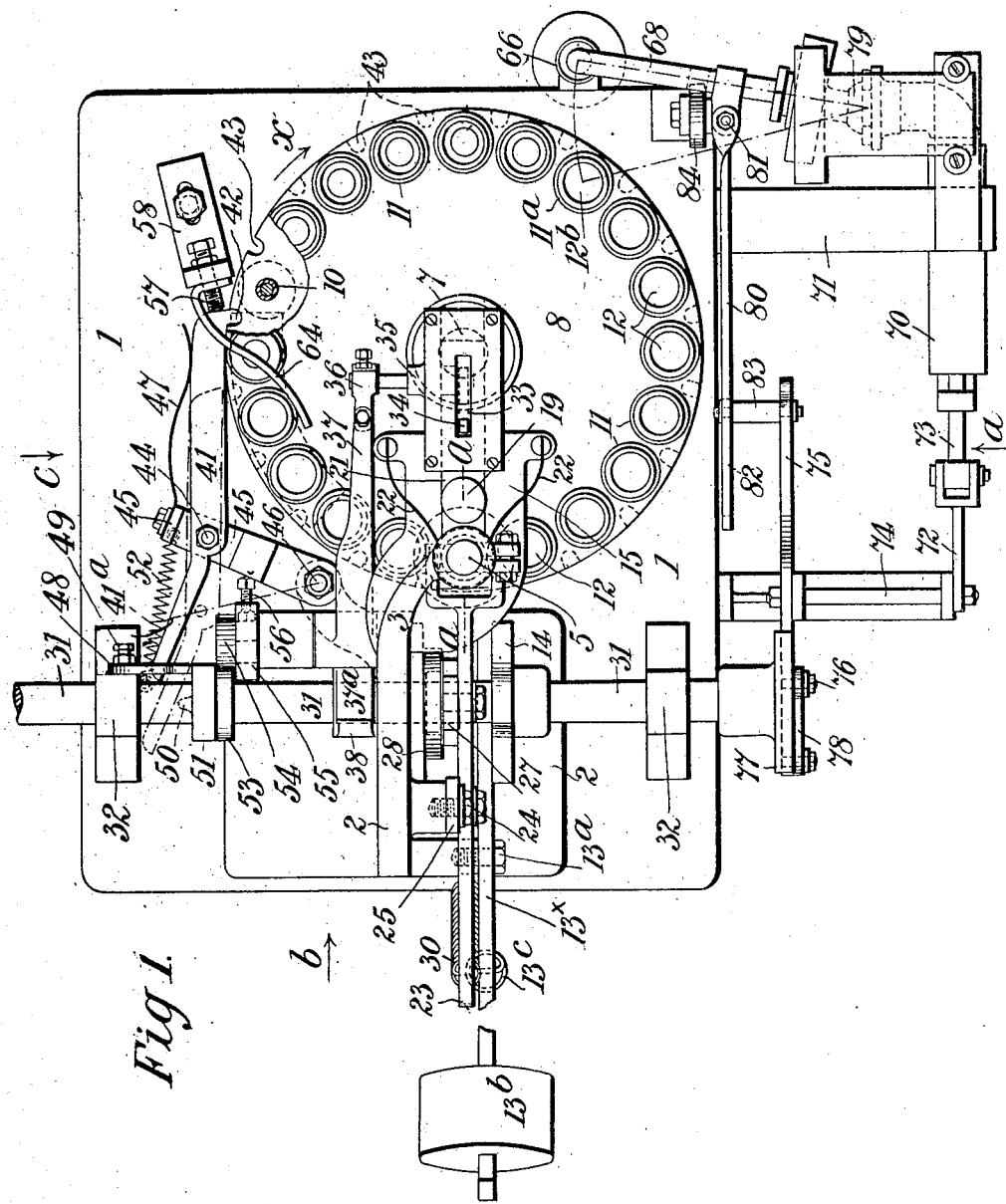

No. 892,169.  
J. LOWMAN.  
PATENTED JUNE 30, 1908.

MACHINE FOR THE MANUFACTURE OF STOPPERS
FOR STOPPERING BOTTLES, &c.
APPLICATION FILED FEB. 8, 1906.

6 SHEETS—SHEET 1.

WITNESSES:
Edward O'Lear
A. F. Suhrbier

INVENTOR
John Lowman
By
Sauer Gropel
ATTORNEYS.

No. 892,169. PATENTED JUNE 30, 1908.
J. LOWMAN.
MACHINE FOR THE MANUFACTURE OF STOPPERS
FOR STOPPERING BOTTLES, &c.
APPLICATION FILED FEB. 8, 1906.

6 SHEETS—SHEET 4.

WITNESSES:

INVENTOR
John Lowman
BY
ATTORNEYS.

No. 892,169. PATENTED JUNE 30, 1908.
J. LOWMAN.
MACHINE FOR THE MANUFACTURE OF STOPPERS
FOR STOPPERING BOTTLES, &c.
APPLICATION FILED FEB. 8, 1906.
6 SHEETS—SHEET 5.
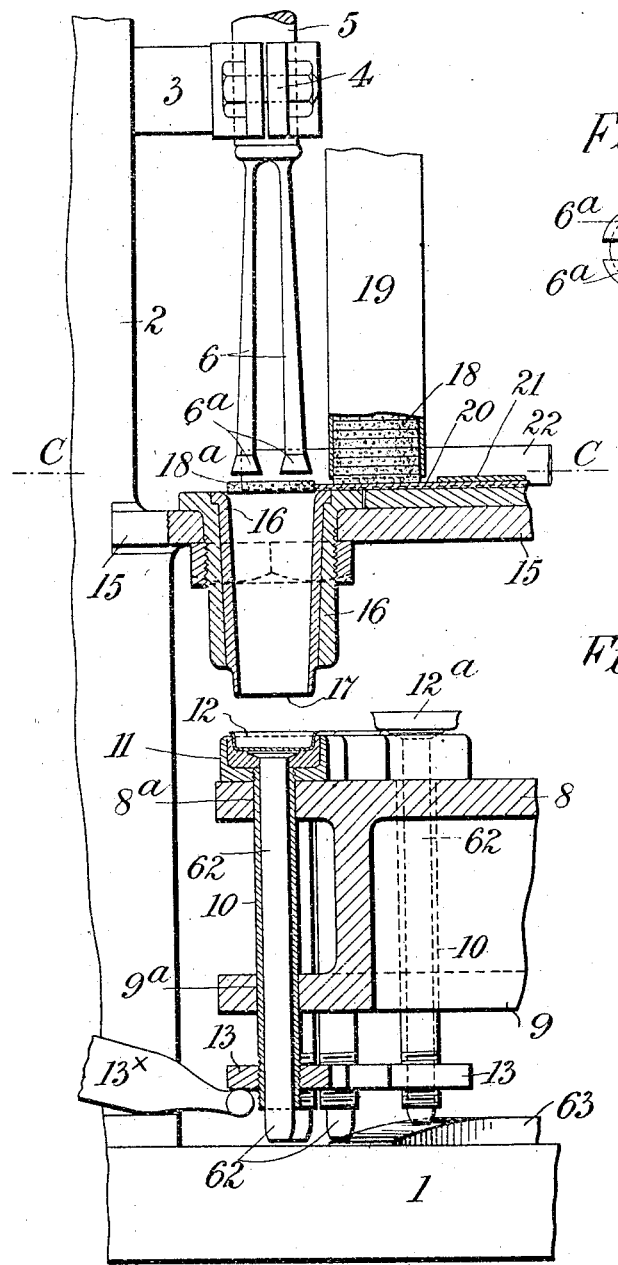
WITNESSES:
INVENTOR
John Lowman
BY
ATTORNEYS.

No. 892,169. PATENTED JUNE 30, 1908.
J. LOWMAN.
MACHINE FOR THE MANUFACTURE OF STOPPERS
FOR STOPPERING BOTTLES, &c.
APPLICATION FILED FEB. 8, 1906.
6 SHEETS—SHEET 6.
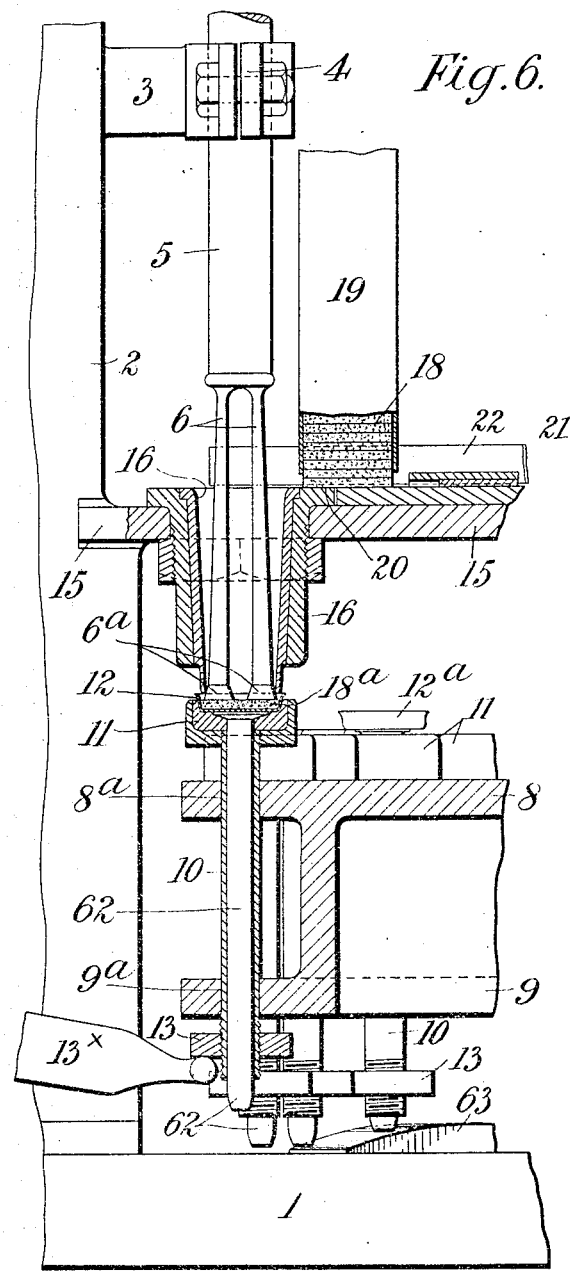
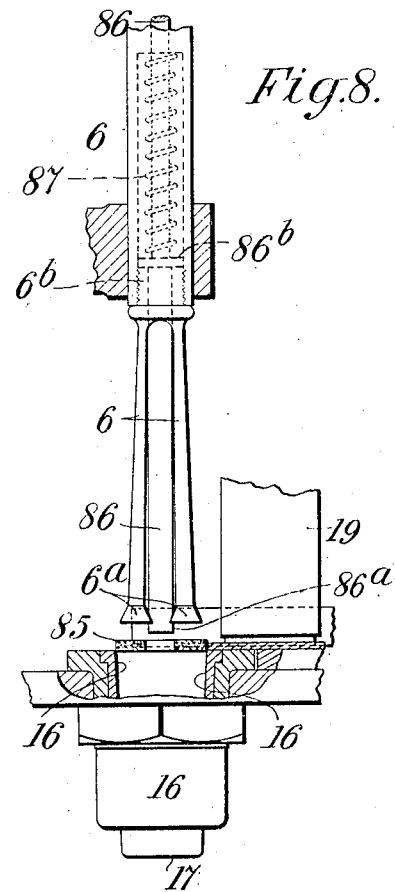
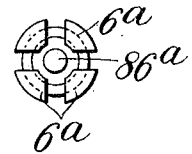
WITNESSES:
INVENTOR
John Lowman
BY
ATTORNEYS

UNITED STATES PATENT OFFICE.

JOHN LOWMAN, OF LONDON, ENGLAND.

MACHINE FOR THE MANUFACTURE OF STOPPERS FOR STOPPERING BOTTLES, &c.

No. 892,169.

Specification of Letters Patent.

Patented June 30, 1908.

Application filed February 8, 1906. Serial No. 300,192.

*To all whom it may concern:*

Be it known that I, JOHN LOWMAN, engineer, a subject of the King of Great Britain, residing at 36ª Ludwick road, New Cross, London, England, have invented a Machine for the Manufacture of Stoppers for Stoppering Bottles, Jars, or other Receptacles or the Like Purposes, of which the following is a specification.

This invention consists of machinery for laterally compressing cork or the like sheets, disks, wads, washers, pads, packing, or layers or the like and inserting the same into capsules, covers, caps, or the like of any suitable material to thereby produce an improved stopper consisting of such cork held in compression laterally or edgewise in its capsule or cover for stoppering bottles or for other purposes.

Machinery according to the present invention for compressing cork disks etc. laterally (*i. e.* edgewise) and inserting them into caps or capsules or covers of sheet metal etc. is such that it will laterally compress the cork disks etc. and, while so compressed edgewise, will force or place them into their caps, covers, capsules, or holders (all of which I will hereinafter refer to as the "capsules") with or without the waxed paper backing or the like backing (such as heretofore frequently employed in capsuled cork disk bottle stoppering devices) so that the laterally compressed cork thus placed in the capsule will be retained therein and thereby in this said state of compression. The machine for this purpose according to this invention is so contrived that it will act automatically to effect the various operations of, feeding the cork disks etc. up to the point at which they are compressed, of laterally compressing the same, of forcing or placing them into their capsules etc.—as well as, if required, fitting a waxed paper backing (or equivalent backing) to said cork etc. and discharge or eject the finished article (stopper) from the machine; all of which operations are effected by a series of self contained movements operated by power from any suitable source.

The object of laterally compressing the cork disks etc. previous to inserting them into their metal capsules and holding same in this compressed state is to tend to close up the grain holes or pores in the cork or compact or compress the latter so as to render the same less liable to leakage and prevent cork dust falling from the pores into or among the contents of the receptacle.

I will now describe one form of machine according to the present invention for compressing cork disks and inserting them into sheet metal caps or capsules as follows:—

Figure 2:
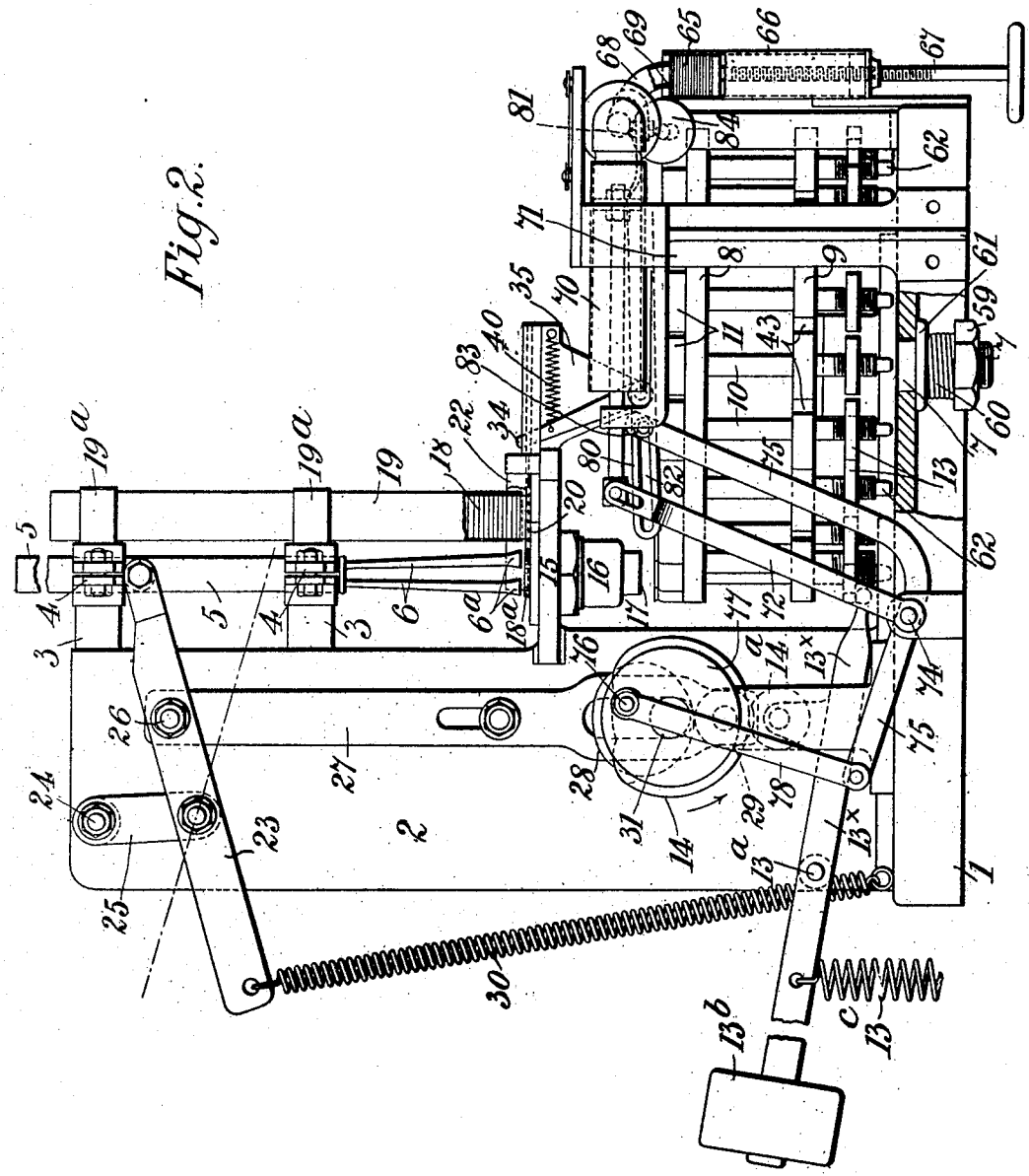
Figure 3:
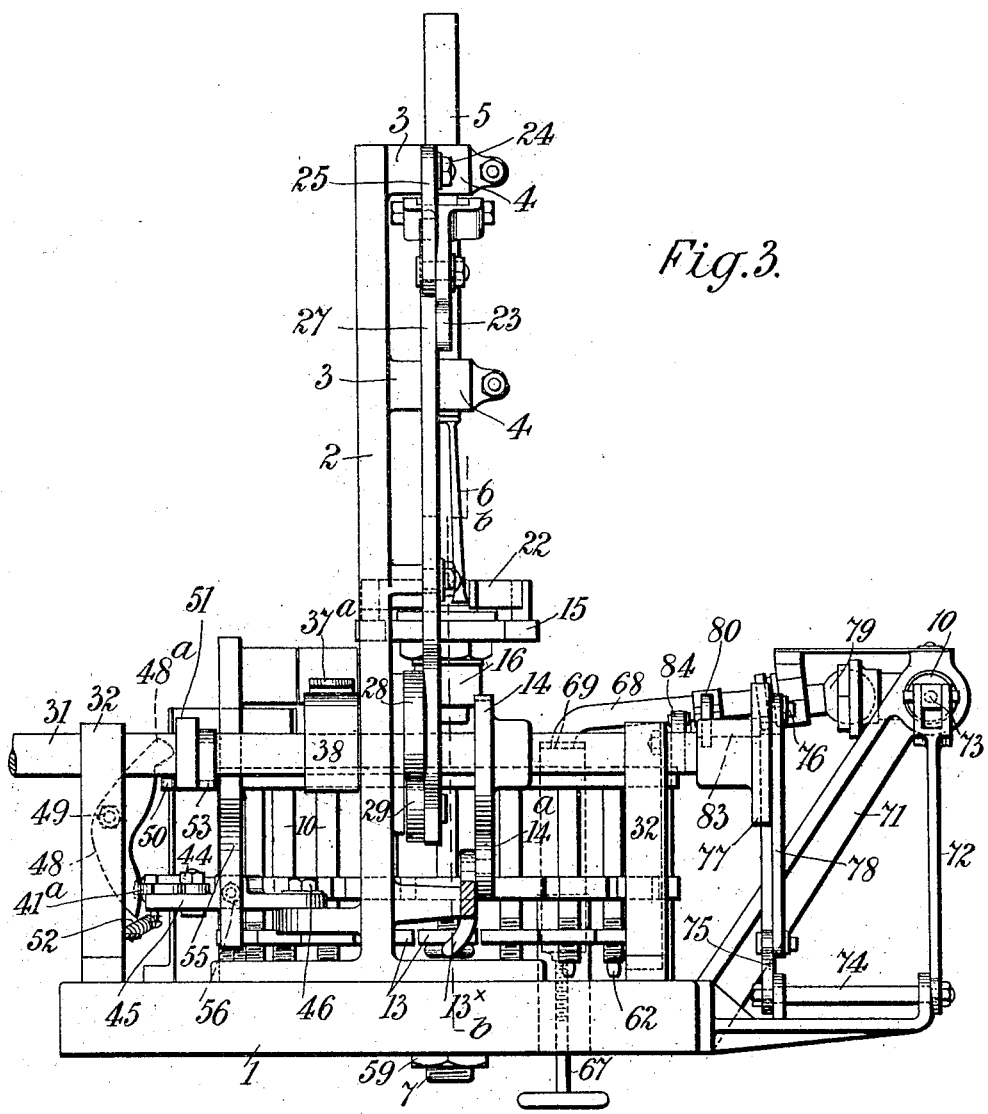
Figure 4:
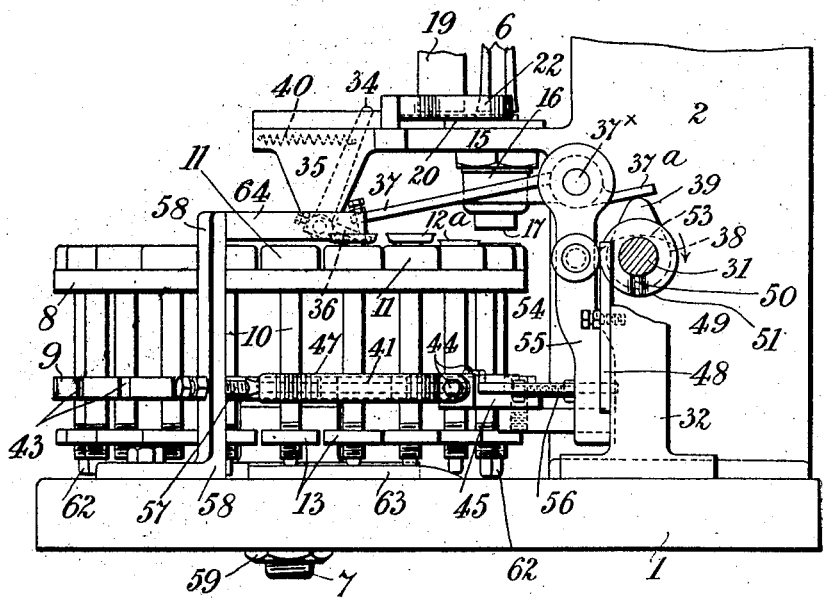

In the accompanying drawings:—Figures 1 to 4 illustrate the construction of the machine. Figs. 5 to 6 illustrate the mode of operation of the special plunger and the cone-shaped piece to be hereinafter described. Fig. 7 illustrates the working face of the special plunger. Fig. 1 is a general plan of the machine (which may be constructed of metal throughout) with part broken away to show details of construction. Fig. 2 is a view in elevation looking in the direction of the arrow *a* Fig. 1. Fig. 3 is a view in elevation looking in the direction of the arrow *b* Fig. 1. Fig. 4 is a view in elevation of the opposite side to Fig. 2 *i. e.* Fig. 4 is a view looking in the direction of the arrow *c* Fig. 1—omitting the vertical frame and mechanism for operating the special plunger. Figs. 5 and 6 are detail vertical sectional views on an enlarged scale on the line *a—a* Fig. 1 and on the line *b—b* Fig. 3 illustrating the mode of operation of the special plunger and cone-shaped piece. Fig. 7 is a view of the end face of the special plunger which engages the cork piece *i. e.* looking upwards on the line *c—c* Fig. 5. Figs. 8 and 9 are detail views corresponding to Figs. 5 and 7 showing a modification with regard to the plunger for the purpose of enabling the machine to compress cork rings or washers instead of cork disks.

1 is a foundation plate resting on legs or brackets or other support so that the work may be carried out at convenient height from the ground. To the plate 1 is securely fastened a vertical bracket or standard 2 of suitable height; projecting from the said standard 2 towards its upper end are two horizontal arms 3 3 furnished with bearings 4 4 which carry a vertical spindle 5 terminating at its lower end in a special plunger 6 to be hereinafter described. Upon the said plate 1 is fixed a vertical spindle 7 (Figs. 1 and 2) forming the axis of rotation of a table 8, 9. Centrally arranged around the upper plate 8 of the said table and near its circumference are a series of holes 8ª and 9ª varying in number according to circumstances. The distance between the center of the revolving table 8 and the center of each of these holes 8ᵃ and 9ᵃ is equal to that between the center of the said table 8, 9 and the center of the special plunger 6 aforesaid—so that each hole in turn may be brought centrally under the said plunger 6. 9 is the bottom plate of the said table which is spaced-apart from the top plate 8 so as to give a greater length of bearing support to the hollow spindles 10 which are arranged to slide vertically through the said holes 8ᵃ 9ᵃ (Figs. 5 and 6) formed in the top and bottom plates of the table 8 and 9 (see Figs. 2, 4, 5, 6). At the top of each of the said hollow spindles 10 is a cup 11 adapted to receive the holder which may be a metal cap or capsule 12 into which the laterally compressed cork disk is to be forced. At the bottom of each of the said hollow spindles 10 is a vertically adjustable collar 13 (Figs. 5 and 6) in contact with which is a tappet lever 13ˣ operated by a cam 14 or suitable mechanism in such manner that each hollow spindle 10 and its cup 11 is elevated in turn at the moment when they are brought underneath the special plunger 6 by the rotation of the table 8 9.

The mode of action of the tappet lever 13ˣ may be more readily understood by reference to Fig. 2 as follows:—The tappet lever 13ˣ is pivoted at the point 13ᵃ to the vertical standard 2 and is provided at its outward end with a weight 13ᵇ and spring 13ᶜ. The lifting action of the said weight 13ᵇ and spring 13ᶜ on the opposite or inner end of the said tappet lever 13ˣ is controlled by the rotation of the aforesaid cam 14 working on the roller 14ᵃ attached to the inner end of the tappet lever 13ˣ.

Referring now more particularly to Figs. 5 to 7:—15 is a table fixed rigidly to the vertical standard 2 at a suitable height above the table 8 aforesaid and having a circular opening located centrally with the longitudinal axis of the aforesaid special plunger 6 and in vertical alinement therewith. In the said circular opening is securely fixed a compression-tube 16 having a conical bore in such manner that the nozzle 17 forming the outlet at the lower end projects downwards towards the table 8 and rests in the cap or capsule 12 at the moment when the cup 11 is raised by the action of the tappet lever 13ˣ as aforesaid. The use of the said cone-shaped tube 16 is in conjunction with the special plunger 6 for compressing the cork disks 18 and guiding them into the said capsules 12 in the manner to be hereinafter described. The inside diameter of the said conic piece 16 is greater at the top than at the bottom; that at the bottom being advantageously slightly less than the internal diameter of the metal capsule 12 which is to receive the cork disk 18ᵃ after being laterally compressed. Forming part of or attached to the vertical spindle 5 before referred to is the aforesaid special plunger 6 which is of such form and construction that—while it is adapted to force the cork piece (cork disk etc.) 18ᵃ before same through the said conic piece 16—its lower end 6ᵃ normally tends to expand to such an extent that it will engage the cork piece at the outer edge of said cork. While this expanded end will enter the mouth of the conic piece 16 such expanded end will bear against the inside wall of the latter and as it is forced through the said expanded end pieces be forced radially inwards towards one another and thereby this end of the plunger where it is presented to and in contact with the cork will be collapsed or forced centrally together by the walls of the said conic piece 16 as the plunger is caused to travel through the said conic piece and push the cork piece 18ᵃ in advance of it. The plunger end 6ᵃ as well as the cork piece 18ᵃ are both "compressed" by the converging side walls of the conic piece 16 until the cork piece 18ᵃ has been passed (in this compressed state) into the inclosing cap or capsule whereupon as the plunger 6 is withdrawn the lower end of it 6ᵃ gradually expands or spreads again (by reason of its formation) and as it is permitted so to do by the interior walls of the conic piece 16 until its limit of expansion is reached. For example said special plunger 6 6ᵃ may be made as shown in Figs. 5 and 7. Conveniently near said special plunger 6 is fixed a tube or container 19 (secured in the brackets 19ᵃ) for holding the cork disks 18; the bottom of said tube 19 does not reach the level of the top 20 of said table 15 and cone-shaped compression-tube 16, by a distance equal to rather more than the thickness of one cork disk but less than that of two cork disks. The brackets 19ᵃ are carried by the plunger-supporting brackets 3 and the disk-containing tube is thus supported parallel to the compression-plunger. Sliding underneath said tube 19 and suitably guided is a pushing piece 21 (Fig. 1) adapted to push the bottom-most cork disk from beneath the said tube 19 over the cone-shaped compression-tube 16 aforesaid in which position it is retained by any convenient means such as the two flat springs 22 22 (Fig. 1) forming spring holding jaws which laterally engage the edge of the disk at opposite points. Vertical movement at the required moment may be imparted to the said special plunger 6 by a cam-operated lever or any other suitable means for example by a rocking bar or lever 23 (Figs. 2 and 3) which is attached to the pivot 24 by the link 25. The said lever 23 is connected at the point 26 to the connecting rod 27 which is actuated by the elliptical cam 28 (on the shaft 31) pressing on the roller 29 secured to the lower end of the said rod 27. By the rotation of the cam 28 the rod 27 is drawn downwards and consequently the special plunger 6 is forced downwards through the conic piece 16 (see Fig. 6). The return movement of the said special plunger is effected by the spring 30 attached to the opposite end of the rock lever 23. The said cam 28 and also the before-mentioned cam 14 may advantageously both be mounted on and secured to a main shaft 31 which is journaled in suitable bearings 32 attached to the foundation plate 1. The said main shaft 31 may be operated by any suitable power.

Means for operating the aforesaid pushing piece 21 may be arranged in any suitable manner—advantageously as follows:—Referring to Figs. 1 to 4:—The pushing piece 21 is made with a slot 33 (Fig. 1) at one end in which the end of a rocking arm 34 engages. The said rocking arm 34 is pivoted to a downwardly projecting bracket 35 of the fixed table 15 and has a short crank arm 36 secured thereto at about right angles (see Fig. 4). A tappet lever 37 is pivoted to the vertical standard 2 at the point 37× in such manner that one end of the said tappet lever 37 rests on the crank 36 of the rock arm 34 while the other end 37ᵃ is in contact with a cam roller 38 (on the main shaft 31) having a projecting cam 39. It will readily be seen that on the rotation of the said cam roller 38—the projection 39 will cause the tappet lever 37 to strike the crank 36 of the rock arm 34—thereby actuating the pushing piece 21 in the manner previously described. The withdrawal of the pushing piece 21 is effected by the spring 40 (Figs. 2 and 4) attached to the rock arm 34.

A suitable mechanism for the purpose of intermittently revolving the table 8 9 step by step around its vertical axis 7 is as follows:—Referring more particularly to Figs. 1 3 and 4:—The pusher bar 41 is provided with a nose or projection 42 adapted to engage in one of the recesses 43 spaced equidistant apart all round the lower plate 9 of the table 8 9 (see Figs. 1 and 2). This pusher bar 41 is pivoted at 44 to the rock arm 45 pivoted at 46 to the frame of the machine and the said pusher bar 41 is normally kept pressed into engagement with one or other of the said notches 43 by means of the spring 47 attached at its other end to the rock arm 45. The pusher bar 41 has an extension piece 41ᵃ which is engaged by a rock lever 48 pivoted at 49 to the frame of the machine the other end 48ᵃ of this rock lever 48 being acted on by the crank-pin 50 carried on the collar 51 fixed to and rotated by the shaft 31 so that it will readily be seen when the crank pin 50 rocks the rock lever 48 the latter operates the extension piece 41ᵃ and serves to lift the nose 42 of the pusher bar 41 clear of the notches 43 and table 8, 9, at which moment the extended spring 52 will pull back the pusher bar 41 into about the position shown in dotted lines in Fig. 1 at which point the nose 42 of said pusher bar will engage in the next notch 43 in position to move the table round the distance between two notches in the direction indicated by the arrow x in Fig. 1. The pusher bar 41 is forced in the direction of the arrow x by means of the cam 53 on the shaft 31 (see Fig. 4) which rides against the roller 54 pivoted on the hanging lever 55 which may be pivoted on the same axis 37× as the tappet lever 37 see Figs. 1 and 4. This hanging lever 55 at its lower end carries a laterally extending adjustable pin or stud 56 which bears against the rock arm 45 whereby the latter is forced (together with the pusher bar 41 pivoted thereto) towards the arrow x and thereby the table 8 9 is forced round one notch in the direction of said arrow until the end 42 of the pusher bar 41 comes in contact with the adjustable stop 57 carried on the adjustable bracket 58.

The various cams and motions of the machine are so set and timed relatively to one another that the various operations of (a) rotating the table 8 9 (b) pushing the bottommost cork disk from under the tube 19 into position over the conic piece 16 (c) forcing down the special plunger 6 6ᵃ (d) moving upwards the hollow spindle 10 and cup 11 etc., etc. and all the other parts of the machine as a whole are so arranged as to act in coöperation as will be readily understood. The adjustable stop 57 furthermore serves to insure that the hollow spindles 10 and cups 11 register accurately with the conic piece 16 and the plunger 6ᵃ as well as serving to arrest the movement of the pusher bar 41 and consequently of the table 8 at the desired position as aforesaid.

To steady the rotation of the table 8 9 a friction brake may conveniently be provided—such as the nut 59 (Figs. 2 3 4) screwed up against a spring 60 and a washer 61 pressing against the lower side of a bearing through which the table 8 is hung. Means may also be provided for feeding the caps or capsules 12 into the cup 11 at the top of each spindle 10 for example a modification of the device above referred to in connection with feeding the cork disks 18 into the cone-shaped guide piece 16 may be employed or any other suitable means or same may be placed in the cups by hand. We may also employ any convenient and suitable device for discharging each said capsule 12 from its cup 11 after the compressed cork disk has been inserted—for example by the lifting and ejecting spindles 62 (Figs. 4, 5, 6,) fitted vertically in each of the said hollow spindles 10 extending beneath the bottom thereof and kept down by its own weight. After each cup 11 holding a cap or capsule 12 has passed under the conic piece 16 the rotation of the said table 8 causes the lower end of each lifting spindle 62 to ride up a curved inclined plane 63 whereupon the top of the said spindle 62 forces out the compressed cork lined metal capsule 12a as shown clearly in Figs. 4 and 5. The said cork lined capsules 12 may be removed from the table 8 by a curved piece 64 (Fig. 1) attached to the bracket 58 and interposed in the path of travel of said capsules, or by any other suitable means.

The action of the machine as above described is as follows:—The caps or capsules 12 (Figs. 1 4 5 and 6) having been placed in the cups 11 (either by the mechanism of the machine itself or by hand) the various cams are set in motion by any suitable power as before described. The first motion places any one of the cups 11 of the series (containing a cap or capsule 12) directly underneath the aforesaid special plunger 6. The said cup 11 is raised by the tappet lever 13× until it is in contact with the nozzle of the conical compression-tube 16 aforesaid (as illustrated in Fig. 6). The flat pushing piece 21 (for pushing the cork disks) slides across and underneath the tube 19 containing the cork disks 18 and pushes one of them 18a over the opening in the cone-shaped piece 16 (see Fig. 5) where it is retained in position by the flat springs 22 (Fig. 1) already described; the special plunger 6 now descends (Fig. 6) and engages the cork practically all round towards its edge and adapting itself (by reason of its special formation) to the interior of the cone-shaped piece 16 forces the cork disk 18a through the cone-shaped piece compressing the cork laterally (i. e. from its outer edge) as it descends into the cap or capsule 12 in the cup 11—as clearly shown in Fig. 6 aforesaid. The pushing piece 21 now slides back into the original position and the plunger 6 does the like. The spindle 10 with its cup 11 is next released by the tappet lever 13×, and falls back to its original position; the rotation of the table 8 by the pusher bar 41 now brings the automatic mechanism into use to eject the compressed cork-lined capsule 12a (Figs. 4 5 6) from the cup 11 and remove same from the table 8 in the manner previously described. The table 8 is next turned round by the said pusher bar 41 until the next cup 11 comes under the plunger 6 and the operation is repeated and so on. The friction brake 61 (Fig. 2) underneath the table 8, 9, steadies the latter while being moved round step by step.

It may be desired to back the compressed cork disks with waxed paper or the like disks—a device for doing so is as follows:— In Figs. 1 2 and 3 the paper disks 65 are contained in a tube 66 and an automatically operated screw 67 is applied at the bottom of said tube 66 to force the disks 65 up said tube, and is so arranged as to keep the top of said pile of paper disks 65 approximately level all the time said disks are being picked up for use. A swinging tubular arm 68 is provided having a mouth-piece 69 at one end and adapted to make close contact with the top of said stack of paper disks 65 (Fig. 2) while at the other end it is connected with a pump 70 or other apparatus capable of alternately producing in said tubular arm 68 a condition more or less of vacuum or pressure. The said pump 70 is rigidly held in position by a bracket 71 which is secured to the foundation plate 1 and may be operated by any suitable means—for example by a slotted lever 72 (attached to the pump piston rod 73) which lever 72 is rigidly connected by the spindle 74 to a rocking arm 75 and the said rocking arm 75 is actuated from the crank pin 76 of the revolving disk 77 by the connecting link 78. The same rocking arm 75 may advantageously be employed to operate the aforesaid tubular arm 68 in the following manner:—The tubular arm 68 is attached to the pump 70 by a ball and socket joint 79 (Figs. 1 and 3) and to a convenient point on the said tubular arm 68 a rod 80 is secured by the pivot 81 (Fig. 1). The opposite end of the said rod 80 is formed with a slot 82, and the end of the rocking arm 75 is attached to the rod 80 aforesaid by a pin 83 which slides in the said slot 82. By this arrangement the tubular arm 68 remains at rest during the greater part of the stroke of the rocking arm 75 and is only moved when the pin 83 comes to the end of the slot 82 in either direction. A roller 84 is pivoted to the frame of the machine in such manner that when the tubular arm 68 is moved by the rod 80, the said arm 68 rides over the roller 84 and its nozzle 69 is thereby first raised and then lowered in the manner now to be described.

The action of the above described apparatus is as follows:—By the first motion the tubular arm 68 is swung over the tube 66 containing the paper disks 65 and its mouthpiece 69 is pressed down on the topmost disk; at that moment by the outward stroke of the piston of the pump 70 a vacuous condition is produced in the tubular arm 68 and this said top disk is picked up by the mouthpiece 69 by suction. By this time the pin 83 (Figs. 1 and 2) attached to the rocking arm 75 has traveled to the end of the slot 82 and now moves the rod 80 and consequently the tubular arms 68 towards the table 8. By the travel of the tubular arm 68 over the fixed roller 84 above described the nozzle 69 of the said arm 68 is first raised out of the disk tube 66 (carrying the top disk with it) and at the termination of the stroke is again caused to descend into a cap or capsule 12b in the cup 11a on the table 8 (see Fig. 1) prior to the said capsule receiving its cork disk. The stroke of the piston of the pump 70 is now reversed whereby the vacuous condition is destroyed and more or less pressure is produced in the tubular arm 68 aforesaid thereby releasing the paper disk and depositing it in the said metal capsule 12$^b$ on the table 8. The arm 68 is then swung back and the operation repeated and so on.

Referring now to the modification shown in Figs. 8 and 9: In these figures means are illustrated for laterally compressing cork rings or washers said cork rings being fed as in the case of the cork disks from a container 19 over the mouth of the conic piece 16 a cork ring 85 being shown in position in Fig. 8 over said conic piece and held in such position in any suitable manner as for example by the spring jaws 22 as shown in Fig. 1 for holding the cork disks.

In order to support the inner circumference of the cork ring while it is being laterally compressed a movable mandrel 86 is employed located centrally between the inwardly collapsible arms of the special plunger 6, the lowermost end 86$^a$ of this movable mandrel normally extending below the lowermost end 6$^a$ of the collapsible plunger (see Fig. 8) so that on the descent of the plunger 6 the lowermost end 86$^a$ of the mandrel first enters the central aperture in the cork ring before compression commences and affords an internal support all round the inner edge of said cork ring so that as the latter is forced through the conic piece 16 by the collapsible plunger 6 6$^a$ (as in the case of the cork disks) the cork ring is compressed laterally upon said mandrel. This mandrel 86 is mounted so as to be capable of independent movement longitudinally with respect to said plunger, for example as illustrated said mandrel 86 may be provided with a collar 86$^b$ which fits down upon the shoulder 6$^b$ formed inside the hollow upper part of the plunger 6; while a spring 87 located inside said hollow part of the plunger 6 bears upon said collar 86$^b$ and keeps the mandrel 86 normally pressed outwards as shown in Fig. 8.

At or near the bottom of the downward stroke of the plunger 6 6$^a$ the bottom end 86$^a$ of the mandrel 86 encounters a central boss or stud provided in the metal capsule or other cap or cover which is thus provided with an annular channel adapted to receive the compressed cork ring therein, and retain same therein under lateral compression; and upon this lower end meeting said central boss or stud the downward movement of the mandrel ceases while the downward movement of the plunger continues a short distance whereby the now compressed cork ring 85 is not only pushed out of the lower end of the conic piece but is also pushed off the mandrel end 86$^a$ and forced (still under lateral compression) into the said cap or cover.

What I claim is:—

1. The combination, with mechanism to laterally compress the cork disks, of a rotary table, capsule-holding cups carried by said table, table-rotating means, and means for successively shifting said cups relatively to said table into coöperative relation with said compression mechanism.

2. The combination, with compression mechanism embodying a conical tube, of a rotary table, a series of capsule-holding cups carried by said table and movable successively into registry with said compression-tube, and means to shift said cups in axial direction over the discharge-mouth of said compression-tube.

3. The combination, with disk-compressing mechanism comprising a conical compression-tube and a plunger operating therein, of a rotary table rotative in lateral direction below said compression-tube, a series of capsule-receiving cups arranged about the peripheral portion of said table, means to rotate said table, and means to automatically shift each capsule-receiving cup in upward direction toward and over the discharge-mouth of the compression-tube when such cup is alined with said compression-tube.

4. The combination, with an upright compression-tube having a conical bore, of a rotary table, means to rotate said table, capsule-holding cups mounted on said table, spindles carried by said cups, and mechanism for successively shifting said spindles in longitudinal direction.

5. The combination, with a compression-tube and compression-plunger, of a rotary table, capsule-receiving cups mounted on said table and each having attached thereto a slidable spindle movable toward the discharge-mouth of said compression-tube, and mechanism for automatically actuating each such spindle and its cup toward the discharge-mouth of said compression-tube when the cup is in register with said tube.

6. The combination, with a compression-tube and a compression-plunger, of a rotary table, capsule-receiving cups mounted on said table and arranged to successively register with said compression-tube upon the rotation of said table, spindles slidable vertically in said table and attached to said cups, and spindle-actuating mechanism.

7. The combination, with compression mechanism comprising a compression-tube, of a rotary table, a plurality of capsule-receiving cups arranged about the peripheral portion of said table and successively movable into registry with the discharge-mouth of said compression-tube, spindles slidable in said table and attached to said cups and a lever mechanism for successively actuating said spindles.

8. The combination, with the compression mechanism and the rotary table, of the capsule-receiving cups carried by the latter, the spindles carried by said cups and slidable in said table, the adjustable collars on said spindles, and the actuating mechanism engaging said collars.

9. The combination, with the compression mechanism, of the rotary table, the capsule-receiving cups carried thereby, the spindles operating in said table and supporting said cups, the collars threaded on said spindles, and the actuating mechanism embodying the tappet-lever 13× to successively engage said collars.

10. The combination, with the rotary table, of the capsule-receiving cups carried thereby and each embodying a hollow spindle, and an ejecting spindle operating in each of said hollow spindles.

11. The combination, with the rotary table, of the capsule-receiving cups carried thereby and each embodying a hollow spindle, an ejecting spindle operating in each of said hollow spindles, and the cam arranged beneath said table and over which said ejecting spindles ride.

12. The combination, with the rotary capsule-holding table, of the actuating mechanism comprising the rock-arm 45, the shifting arm 41 pivoted to said rock-arm and having the extension 41ª, means for rocking the arm 45, means for engaging the extension 41ª and rocking the arm 41, and the spring 52 for returning said parts to their initial position.

13. The combination, with a supporting-table, of a conical tube mounted therein, a plunger operating in said tube, a disk-containing tube above said table, means to feed the disks from said tube to the ingoing mouth of said compression-tube, a rotary table beneath said compression-tube, capsule-holding cups carried by said table and movable into registry with the mouth of said compression-tube, and means to shift said cups upwardly over the discharge-mouth of said compression-tube.

14. In a machine for making bottle-caps, the combination, with the capsule-holding cups, of the tube to contain the paper disks, and the pneumatic pick-up device to successively transfer such disks from such tube to the capsules.

15. In a machine for making bottle-caps, the combination, with the capsule holding cups, of the tube to contain the paper disks, and the automatically operated pneumatic pick-up device to successively transfer such disks from such tube to the capsules.

16. The combination, with means to support a plurality of capsules, of means for placing a paper disk in each capsule, and means for laterally compressing a cork disk and forcing the same into each capsule on top of the paper disk.

17. In a machine for making bottle-caps, the combination, with a rotary table, and capsule-holding devices carried thereby, of means at one point in the circumference of said table to place a paper-disk in each capsule, and means at another point in such circumference to place a cork-disk in each capsule.

18. The combination, with the rotary table and the capsule-holding devices carried thereby, of a tube for holding the paper disks, and a pneumatically operated pick-up device movable between said tube and said capsule-holding devices.

19. The combination, with the rotary table and the capsule-holding devices carried thereby, of a disk-holding tube, a pneumatic pick-up arm 68, means to move said arm between said tube and said capsule-holding devices, a pump in communication with said arm, and means for automatically operating said pump.

20. The combination, with the rotary table and the capsule-holding devices mounted thereon, of a disk-holding arm, a pneumatic pick-up tube for transferring the disks successively from said disk-holding tube to said capsule-holding devices, and an automatically operated pump in communication with said pneumatic arm.

21. The combination, with the capsule-holding devices, of a disk-containing tube, a pneumatic arm 68, a roller 84 over which said arm is movable from said tube to said devices, and the mechanism for automatically shifting said arm.

22. The combination, with the capsule-holding devices and the disk-containing device 66, of the pick-up arm, the means for automatically controlling said arm to pick up and drop the paper disk, and means for automatically shifting said arm between the device 66 and the adjacent capsule-holding device.

In witness whereof I have hereunto set my hand in presence of two witnesses.

J. LOWMAN.

Witnesses:
 H. D. JAMESON,
 F. L. RAND.